United States Patent [19]
Hartmann

[11] Patent Number: 5,908,468
[45] Date of Patent: Jun. 1, 1999

[54] DATA TRANSFER NETWORK ON A CHIP UTILIZING A MULTIPLE TRAFFIC CIRCLE TOPOLOGY

[75] Inventor: Alfred C. Hartmann, Round Rock, Tex.

[73] Assignee: Advanced Micro Devices, Inc., Sunnyvale, Calif.

[21] Appl. No.: 08/957,093

[22] Filed: Oct. 24, 1997

[51] Int. Cl.$^6$ .................................................. G06F 13/00
[52] U.S. Cl. ......................................... 710/131; 710/101
[58] Field of Search .................................... 395/311, 280, 395/281, 800.01, 200.8, 308

[56] References Cited

U.S. PATENT DOCUMENTS

| | | | |
|---|---|---|---|
| 4,463,421 | 7/1984 | Laws ........................................ | 395/500 |
| 4,468,734 | 8/1984 | Lanier et al. . | |
| 4,797,882 | 1/1989 | Maxemchuk ............................. | 370/406 |
| 4,933,933 | 6/1990 | Dally et al. ............................... | 370/406 |
| 5,099,417 | 3/1992 | Magar et al. ............................. | 395/847 |
| 5,394,389 | 2/1995 | Kremer .................................... | 370/223 |
| 5,563,509 | 10/1996 | Small ...................................... | 324/158.1 |
| 5,761,516 | 6/1998 | Rostoker et al. ........................ | 710/260 |
| 5,764,895 | 6/1998 | Chung .................................... | 395/200.8 |

OTHER PUBLICATIONS

Itano, et al "HIRB: A Hierarchical Ring Bus" University of Tsukuba, Japan, Proceedings of the Nineteenth Annual Hawaii International Conference on System Sciences, 1986, pp. 206–213.

Kim, et al, "A Relational Dataflow Database Machine Based on Heirarchical Ring Network," Korea Advanced Institute of Technology, Proceedings of the International Conference on Fifth Generation Computer Systems, 2984, pp. 489–496.

Su, et al, "Adaptive Fault–Tolerant Deadlock–Free Routing of the Slotted Ring Multiprocessor," IEEE Transactions on Computers, vol. 45, No. 6, Jun. 1996, pp. 666–683.

Gustavson, D.B., "Scalable Coherent Interface and Related Standards Projects," IEEE vol. 12, No. 1, pp. 10–22, Feb. 1992.

Cha, et al, "Simulated Behaviour of Large Scale SCI Rings and Tori," Depts. of Engineering and Computer Science, University of Cambridge, United Kingdom, pp. 1–21, Proceedings of 5th IEEE Symposium on Parallel and Distributed Processing, Dallas, Texas, Dec. 1993.

Franklin, et al, "ARB: A Hardware Mechanism for Dynamic Reordering of Memory References," IEEE Transactions on Computers, vol. 45, No. 5, May 1996, pp. 552–571.

(List continued on next page.)

*Primary Examiner*—Gopal C. Ray
*Attorney, Agent, or Firm*—Conley, Rose & Tayon; Jeffrey C. Hood; Louis H. Iselin

[57] ABSTRACT

A computer chip includes a plurality of modules interconnected in an on-chip data transfer network configured in a circular topology to form preferably a plurality of traffic circles. The various modules may be processors, memories and/or hybrids and may include, or be coupled through, a communications port coupled to one of the buses such that the communications port is operable to transmit and receive data on one of the buses. Each of the communications ports is operable to route data from a source bus to a destination bus. The traffic circles are formed by groups of communications ports, and buses or groups of transfer paths. The buses may be operable to transfer data in only one direction or in two directions. The transfer of data on the buses by the modules may be controlled by an on-chip bus controller coupled to one or more of the buses. The bus controller may also include arbiter logic for arbitrating access to one or more of the plurality of buses. One or more of the plurality of communications ports may be further operable to transfer data from one of the buses to a bus connection operable to route data to a device external to computer chip. One or more of the plurality of buses includes addressing and control lines.

20 Claims, 5 Drawing Sheets

OTHER PUBLICATIONS

Barroso, et al, "Performance Evaluation of the Slotted Ring Multiprocessor," IEEE Transactions on Computers, vol. 44, No. 7, Jul. 1995, pp. 878–890.

Bhuyan, et al, "Approximate Analysis of Single and Multiple Ring Networks," IEEE Transactions on Computers, vol. 38, No. 7, Jul. 1989, pp. 1027–1040.

Arden, et al, "Analysis of Chordal Ring Network," IEEE Transactions on Computers, Vo. C–30, No. 4, Apr. 1981, pp. 291–301.

Kubiatowicz et al, "The Alweife CMMU: Addressing the Multiprocessor Communications Gap," Extended Abstract for Hot Chips '94, 1994, pp. 1–3.

Kubiatowicz et al, "The Anatomy of a Message in the Alewife Multiprocessor," Proceedings of the International Conference on Supercomputing (ICS) 1993, pp. 195–206, Jul. 1993.

DATA TRANSFER NETWORK ON A CHIP UTILIZING A MULTIPLE TRAFFIC CIRCLE TOPOLOGY

BACKGROUND OF THE INVENTION

1. Field of the Invention

The present invention is related to semiconductor computer chips, and more particularly to a system for connecting modules in an on-chip data transfer network utilizing a multiple circular topology.

2. Description of the Related Art

Computer systems have traditionally comprised a system unit or housing which comprises a plurality of electrical components comprising the computer system. A computer system typically includes a motherboard which is configured to hold the microprocessor and memory and the one or more busses used in the computer system. The motherboard typically comprises a plurality of computer chips or electrical components including intelligent peripheral devices, bus controllers, processors, bus bridges, etc.

More recently, computer systems are evolving toward an integration of functions into a handful of computer chips. This coincides with the ability of chip makers to place an increasingly large number of transistors on a single chip. For example, currently chip manufacturers are able to place up to ten million transistors on a single integrated circuit or monolithic substrate. It is anticipated that within several years chip makers will be able to place one billion transistors on a single chip. Thus, computer systems are evolving toward comprising a handful of computer chips, where each computer chip comprises a plurality of functions. The integration of a plurality of modules or functions on a single computer chip requires an improved data transfer chip architecture. Also, due to the shorter distances and tighter integration of components on a chip, new data transfer architectures are necessary to take advantage of this environment. Therefore, an improved system is desired for information transfer between a plurality of different functions or modules on a single computer chip.

SUMMARY OF THE INVENTION

The present invention comprises a computer chip with a plurality of modules interconnected in an on-chip data transfer network configured in a circular topology to form preferably a plurality of traffic circles. The modules couple to a plurality of buses through communications ports either incorporated within the modules or separately interposed between the modules and the buses. Each of the communications ports is operable to route data from a source bus to a destination bus. The plurality of modules are operable to communicate with each other through one or more of the buses.

In another embodiment, the buses are comprised of a plurality of transfer paths forming a bus segment. Each of the plurality of transfer paths is directly connected between two of the communications ports or modules. A first group of transfer paths and a first group of communications ports collectively form a first traffic circle consisting of a closed path of bus segments, and a second group of transfer paths and a second group of communications ports collectively form a second traffic circle consisting of a closed path of bus segments different from the first traffic circle. Each of the communications ports is coupled to at least two transfer paths and is operable to route data from a source transfer path to a destination transfer path. The plurality of modules are coupled to or include at least one of the communications ports and are operable to communicate with each other through the transfer paths. At least a subset of the modules are coupled to one or more communications ports in the first group of communications ports in the first traffic circle, as well as one or more communications ports in the second group of communications ports in the second traffic circle. This subset of modules are operable to communicate through the first traffic circle and the second traffic circle.

In another embodiment, the computer chip comprises a first circular bus and a second circular bus, a plurality of communications ports, and a plurality of modules. Each of the circular buses is configured in a circular topology, and is operable to transfer data in a circular fashion. Each of the plurality of communications ports is coupled to one or more circular data buses and is operable to route data from a source bus to a destination bus. Each of the plurality of modules is coupled to at least one of the communications ports and is operable to communicate with each other through one or more of the buses.

In various embodiments, the buses may be operable to transfer data in only one direction or in two directions. The transfer of data on the buses by the modules may be controlled by an on-chip bus controller coupled to one or more of the buses. The bus controller may also include arbiter logic for arbitrating access to one or more of the plurality of buses. Alternatively, the bus arbiter logic is distributed throughout the modules. The plurality of modules may be any of the following: a processor, a memory, an I/O controller, a task-specific hybrid, and/or a task-general hybrid. One or more of the plurality of communications ports may be further operable to transfer data from one of the buses to a bus connection operable to route data to a device external to computer chip. One or more of the plurality of buses includes addressing and control lines.

BRIEF DESCRIPTION OF THE DRAWINGS

A better understanding of the present invention can be obtained when the following detailed description of the preferred embodiment is considered in conjunction with the following drawings, in which.

Figure 1:
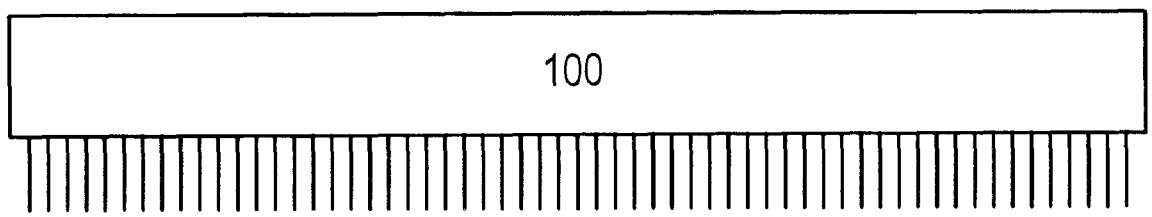
FIG. 1 illustrates a computer chip comprising an on-chip data transfer network according to the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF THE EMBODIMENTS

The present invention comprises a computer chip including a data transfer network utilizing a multiple traffic circle topology. A uniform numbering scheme is adopted for this disclosure; descriptions of one embodiment and/or figure may be used to further understand the workings and usage of other embodiments and/or figures as necessary.

FIG. 1—Computer Chip

Referring now to FIG. 1, a computer chip 100 is shown from a side view. Computer chip 100 preferably comprises a monolithic silicon substrate comprising a plurality of transistors, according to the present invention. The computer chip may also use gallium arsenide (GaAs) or another suitable semiconductor material. Although shown as a ceramic socket mount pin grid array (PGA) package, the computer chip 100 may be packaged in any of various ways, including as a surface mount, socket mount, or insertion/socket mount. Materials used in the packaging of computer chip 100 may include ceramic packages, leadless chip carrier packages (LCC), glass-sealed packages, or plastic packages. Actual type of chip package for computer chip 100 may include, ceramic quad flatpack (CQFP), PGA, ceramic dual in-line package (C-DIP), LCC socket or surface mount, ceramic dual in-line package (CERDIP), ceramic quadpack (CERQUAD), small outline package gull wing (SOP), small outline package J-lead (SOJ), thin small outline package (TSOP) etc. and may have any of various types of connectivity including pin grid array (PGA), ball grid array (BGA), direct chip attach (DCA), metal bands or pins etc. Also usable is the controlled collapse chip connection (C4) method, commonly known as the "flip chip" method.

Computer chip 100 utilizes a plurality of buses configured in a circular topology to interconnect multiple module types on a single computer chip 100, preferably using intelligent buffering and a universal port design. Connecting each module to a communications pathway with a fall duplex, general purpose communications port allows for heterogeneous and homogeneous module types to form a networked system on a single computer chip. The present invention allows "system on a chip" producers to integrate module designs from different sources or module core vendors. This promotes integration of "best of breed" cores from an evolving industry of "virtual component" suppliers. Further details of the components of the computer chip will be given in the descriptions of FIG. 2–5.

Figure 2:
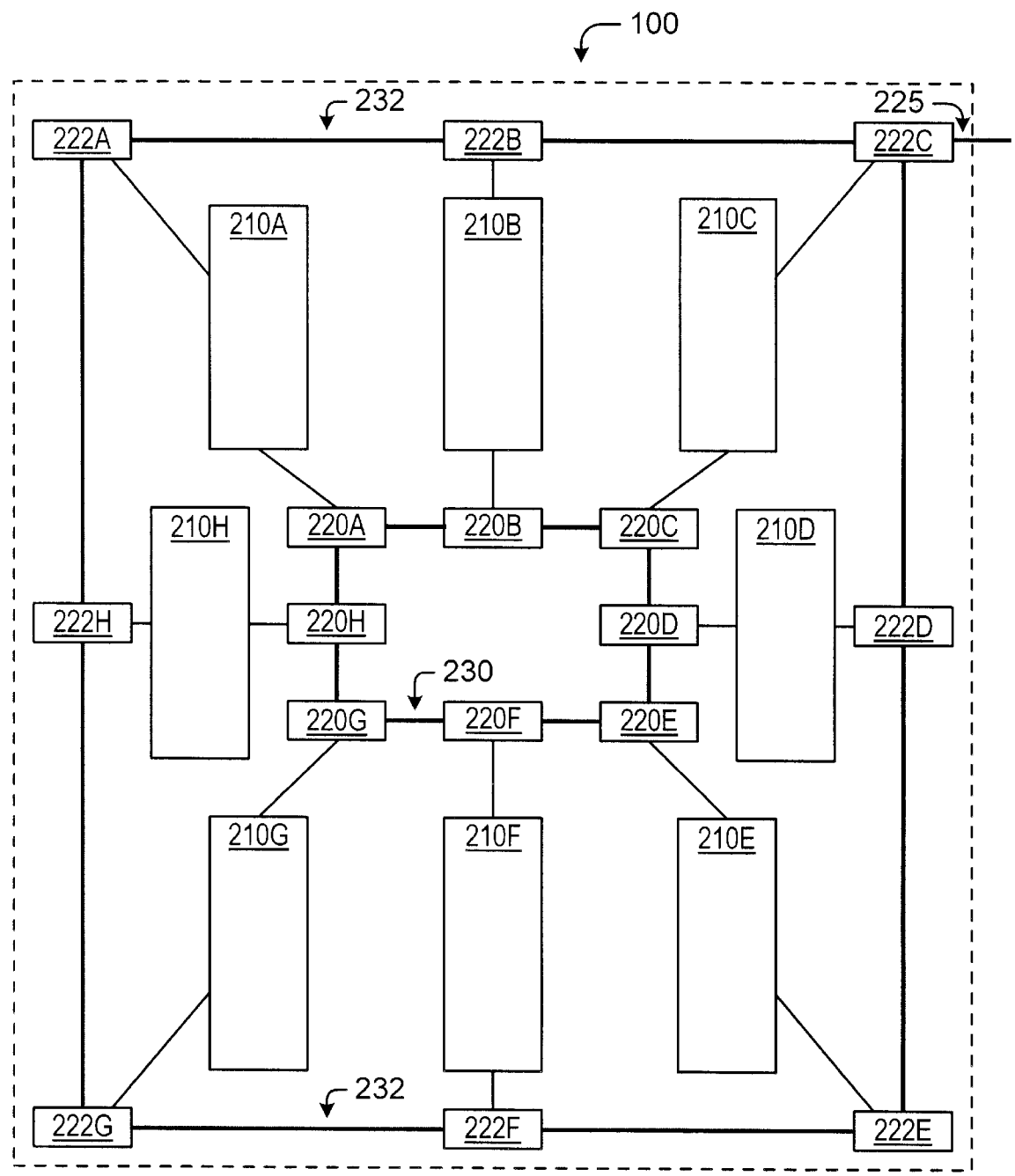
FIG. 2 illustrates an embodiment of the data transfer network shown in FIG. 1 according to the present invention.

FIG. 2—On-Chip Network with Dual Circular Buses

Referring now to FIG. 2, an embodiment is shown of computer chip 100 with a data transfer network utilizing a multiple circular topology for interconnecting a plurality of modules 210A–210H on a single computer chip 100 in an on-chip network. When a reference is made to a component and its associated number, such as module 210, that reference may refer to any of the components with that associated number, such as modules 210A–210H, with or without an additionally associated letter. The components of the network preferably include a plurality of buses, such as buses 230 and 232, in FIG. 1 which provide an electrical path for data communications between the plurality of modules 210 comprised on the computer chip 100. It is noted that although the embodiment of FIGS. 2 and 3 include two buses 230 and 232, a greater number of buses may be included, as desired. When a reference is made to bus 230 or 232, that reference may refer to any part associated with bus 230 or 232, including any sections labeled with an associated letter designation, such as 230A.

The modules 210 preferably perform operations, and modules may be devices such as a processor, an I/O controller, or storage (memory), or a hybrid of tasks, like a task-specific hybrid (ASIC) or a task-general hybrid. Additional details concerning the modules 210 may be found below in reference to FIG. 4. A plurality of communications ports 220A–220H and 222A–222H are also comprised on the computer chip 100. Each of the plurality of communications ports 220 and 222 is coupled to one or more of the buses 230 or 232. Each of the communications ports 220 and 222 is operable to route data from a source bus 230 or 232 or section thereof to a destination bus 230 or 232 or section thereof.

In the embodiment of FIG. 2, computer chip 100 includes, moving in a clockwise fashion from upper left, from the outside in, communications ports 222A–222H coupled to bus 232 in a circular topology. Each communications ports 222A–222H is further coupled to an associated module 210A–210H. Each module 210A–210H is further coupled to an associated communications port 220A–220H which are collectively coupled to bus 230 in a circular topology. Other couplings for the modules 210 are possible, such as to another module 210 or to additional communications ports 220 or 222. Communications port 222C is shown with an additional connection 225 of bus 232 which may be used to couple computer chip 100 to another computer chip.

Each of the buses 230 or 232 may be unidirectional, that is, only transmitting data in one direction. For unidirectional buses 230 or 232, each bus 230 or 232 preferably transmits data in a direction opposite to its nearest neighbor bus 230 or 232. For example, when a first bus 230 or 232 is operable to transfer data in a first direction, a second bus 230 or 232 is operable to transfer data in a second opposite direction. One or more of the buses 230 or 232 may transfer data in two directions. Any bus 230 or 232 may also include addressing and control lines in addition to data lines. Other special function lines may also be included in buses 230 or 232 as desired.

The communications ports 220 or 222 may be physically separate or incorporated into the modules 210. An incorporated communications port 220 or 222 in a module 210 would perform in a similar fashion to transmit and receive data on one or more of the buses 230 or 232. One or more of the communications ports 220 or 22 may be further operable to transfer data from one of the buses 230 or 232 to a bus connection, such as communications port 220 or 222 operable to route data to a device off of the computer chip 100. Special notice is taken of additional connection 225 of bus 232 of FIG. 2 as an example of an off-chip extension of the connections. Additional details of communications ports 220 or 222 may be found below in reference to FIG. 5.

In another embodiment, the data transfer network of computer chip 100, preferably includes a plurality of communications ports 220 or 222 comprised on the computer chip 100 as well as a plurality of transfer paths 230 or 232 comprised on the computer chip 100 along with a plurality of modules 210. Each of the plurality of transfer paths 230 or 232 are directly connected between two of the communications ports 220 or 222 with a first group of the plurality of transfer paths 230 and a first group of the plurality of communications ports 220 collectively forming a first traffic circle and with a second group of the plurality of transfer paths 232 and a second group of the plurality of communications ports 222 collectively forming a second traffic circle different from the first traffic circle. Each of the plurality of communications ports 220 or 222 is coupled to at least two transfer paths 230 or 232. Each of the plurality of communications ports 220 or 222 is operable to route data from a source transfer path 230 or 232 to a destination transfer path 230 or 232. Each of the plurality of modules 210 is coupled to at least one of the plurality of communications ports 220 or 222, and the plurality of modules 210 are operable to communicate with each other through the transfer paths 230 or 232.

In this embodiment, at least a subset of the plurality of modules 210 are coupled to one or more communication ports 220 in the first group of the plurality of communication ports 220 in the first traffic circle. This subset of modules 210 are further coupled to one or more communication ports 222 in the second group of the plurality of communication ports 222 in the second traffic circle. A further subset of the plurality of modules 210 are operable to communicate through the first traffic circle and the second traffic circle.

In one embodiment, each of the groups of transfer paths 230 or 232 is operable to transfer data in only one direction. The preferred direction is the direction opposite to the direction of the other group of transfer paths 230 or 232. In another embodiment, each bus or transfer path 230 or 232 is operable to transfer data in any direction available.

Another embodiment of computer chip 100 includes a first circular bus 230 comprised on the computer chip 100, a second circular bus 232 comprised on the computer chip 100, a plurality of communication ports 220 and 222 comprised on the computer chip 100, and a plurality of modules 210. Each of the first and second circular buses 230 and 232 is configured in a circular topology, and each of the first and second circular buses 230 and 232 is operable to transfer data in a circular fashion. The plurality of communication ports 220 and 222 comprised on the computer chip 100 are coupled to one or more of the first circular data bus 230 and the second circular data bus 232 and are operable to route data from a source to a destination. Each of the plurality of modules 210 is coupled to at least one of the plurality of communication ports 220 or 222 and is operable to communicate with each other through one or more of the buses 230 and 232.

Figure 3:
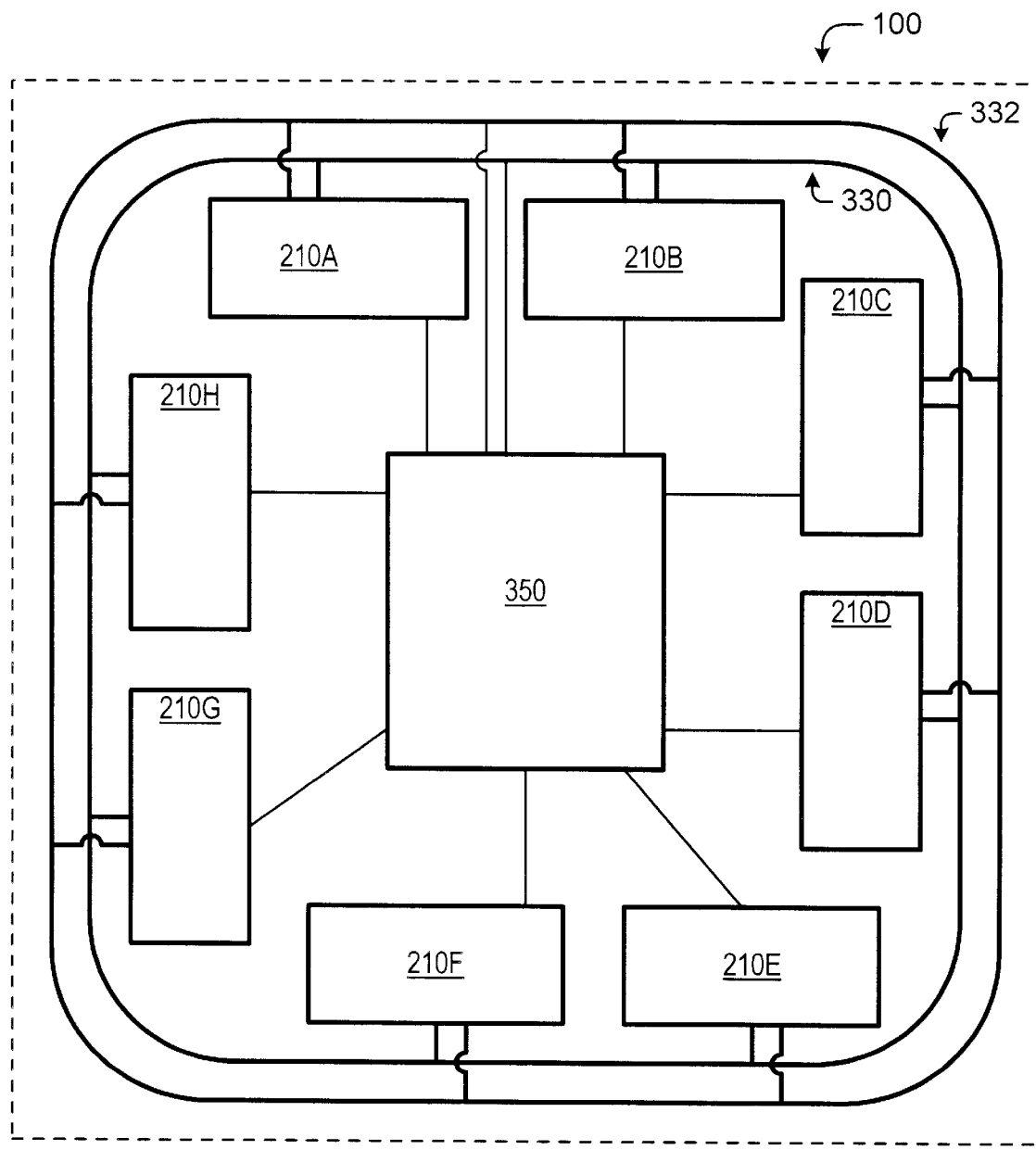
FIG. 3 illustrates another embodiment of the data transfer network shown in FIG. 1 according to the present invention.

FIG. 3—On-Chip Network with Dual Circular Buses and Centralized Bus Controller

Referring now to FIG. 3, another embodiment is shown of computer chip 100 with an on-chip data transfer network utilizing a multiple circular topology for interconnecting a plurality of modules 210A–210H on a single computer chip 100. A primary difference between FIG. 2 and FIG. 3 is the coupling of a bus controller 350 to buses 330 and 332 for controlling the transfer of data on buses 330 and 332. Some details of FIG. 3 are described in detail in reference to FIG. 2 using the uniform numbering scheme. The components of the network preferably include a plurality of buses represented in FIG. 3 as buses 330 and 332 which provide an electrical path for data communications between the plurality of modules 210 comprised on the computer chip 100. The numbers 230 and 232 are used for the buses or transfer paths of FIG. 2; the numbers 330 and 332 are used for the buses or transfer paths of FIG. 3. Although the buses 330 and 332 are shown external to the grouping of modules 210, the buses 330 and 332 could also be internal and/or external as suggested by FIG. 2.

In this embodiment, the data transfer network comprises a plurality of buses or transfer paths 330 and 332 linking the plurality of modules 210 through communications ports included in each module 210. The plurality of modules may be coupled to one or more of the buses 330 and 332 and are operable to communicate with each other through the buses 330 and 332 using the communications ports incorporated into each module 210.

The bus controller 350 comprised on computer chip 100 is coupled to one or more of the plurality of buses 330 and 332. The bus controller 350 is operable to control data transfers by the modules 210 on or through the buses 330 and/or 332. The bus controller 350 includes arbiter logic for arbitrating access to the buses 330 and/or 332. Other logic may be incorporated into the bus controller as necessary for control, protocol translation, or other desired function.

FIG. 4—Module

Figure 4:
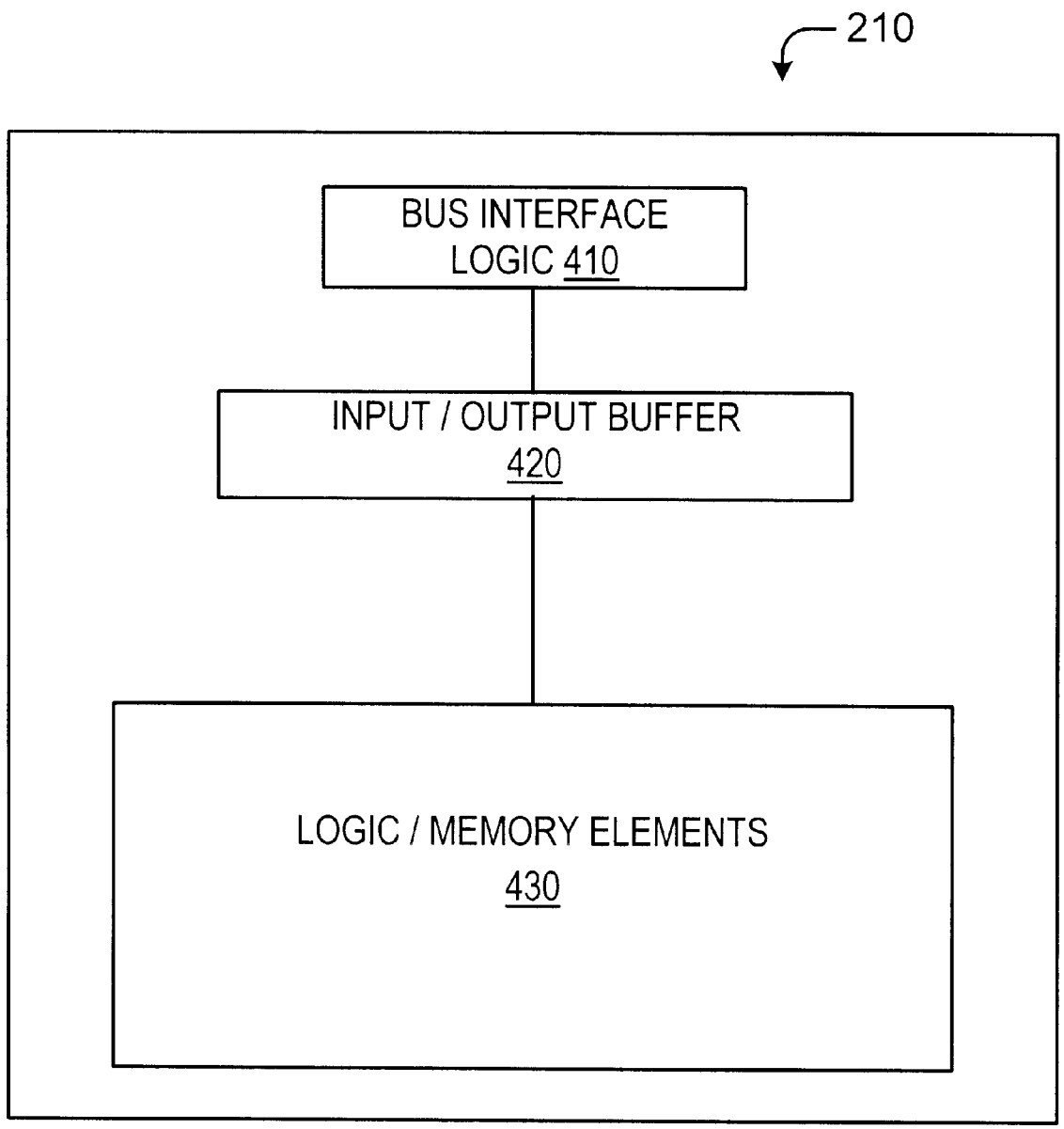
FIG. 4 illustrates an embodiment of a module.

Referring now to FIG. 4, a module 210 is shown. Each module 210 is preferably one of the group which includes processors, memories or hybrids. A processor may be a CPU, FPU, or an I/O controller in any of the variety of possible forms. A memory may be a RAM, ROM, hybrid memory or active memory in any of the variety of possible forms. Hybrids may be task-specific, like an ASIC, or task-general.

Each module may couple to a circular bus 230 or 232, a circular bus 330 or 332, a communications port 220 or 222 or other device as desired using bus interface logic 410 either incorporated in the module 210 or as part of a communications port 220 or 222 physically imposed between the module 210 and the circular bus 230 or 232, etc. A communications port is operable to transmit and receive data on the transfer paths 230 or 232 or buses 330 or 332 either when comprised in the module 210 or independent.

Module 210 preferably transmits and receives data from other modules 210 via an input/output buffer 420 coupled to the bus interface logic 410 and the logic/memory elements 430 of the module 210. Other components with or without other couplings may also comprise the module 210 as desired.

Figure 5:
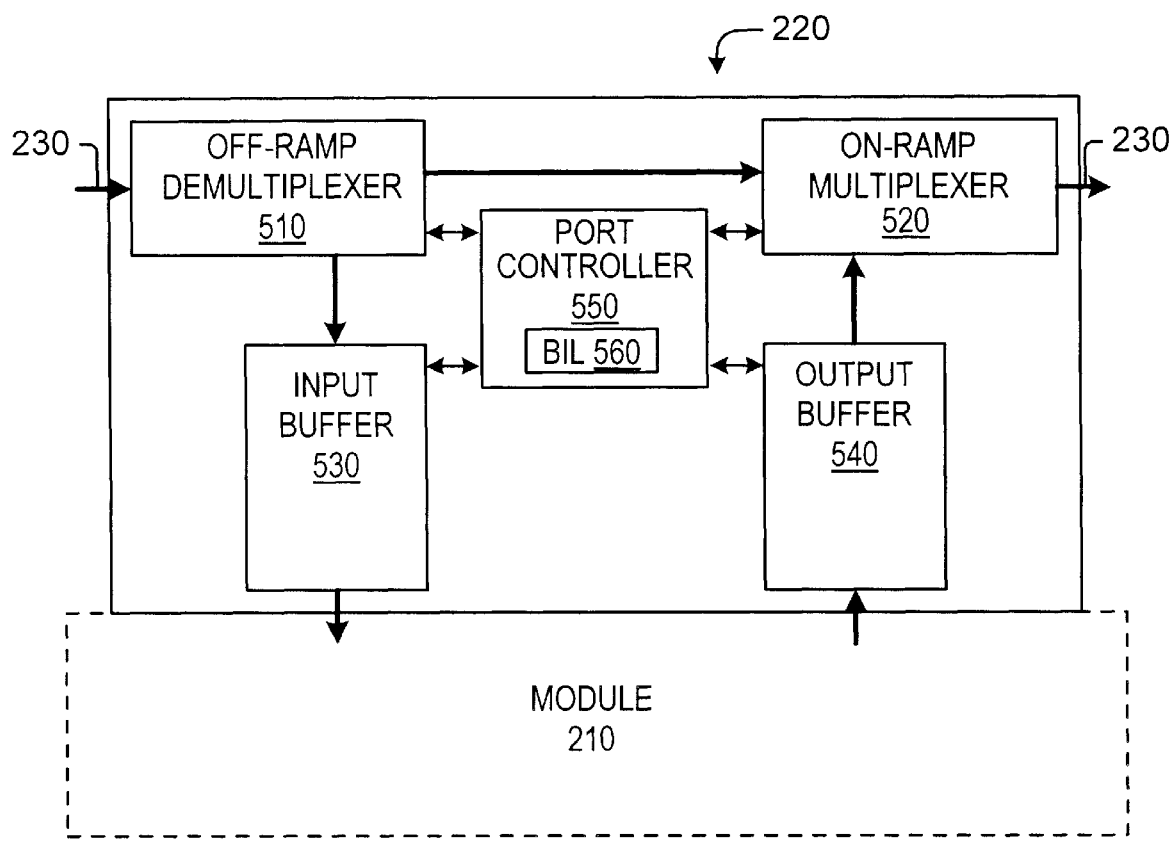
FIG. 5 illustrates an embodiment of a communications port.

FIG. 5—Communications Port

Referring now to FIG. 5, an embodiment is shown of the internal details of an communications port 220 or 222 for coupling a module 210 comprised on a computer chip 100 to a circular bus 230 or 232 for receiving and sending communications between one or more additional modules 210 comprised on the computer chip 100. The communications port 220 or 222 preferably includes an "off-ramp" demultiplexer 510 for coupling to the circular bus 230 or 232 providing for the off-ramp demultiplexer 510 receiving data from the bit sliced bus 230. An "on-ramp" multiplexer 520 preferably couples to the circular bus 230 or 232 and provides data onto the circular bus 230 or 232. The on-ramp multiplexer 520 further couples to the off-ramp demultiplexer 510, and the off-ramp demultiplexer 510 operates to provide data to the on-ramp multiplexer 520 for "through traffic". An input buffer 530 preferably couples to the off-ramp demultiplexer 510, and the input buffer 530 includes connections (not shown) for coupling to the module 210. An output buffer 540 preferably couples to the on-ramp multiplexer 520, and the output buffer 540 also includes connections (not shown) for coupling to the module 210.

The off-ramp demultiplexer 510 operates to receive data from the circular bus 230 or 232 and demultiplex a portion of the data intended for the module 210 and provide the portion of the data intended for the module 210 to the input buffer 530. The input buffer 530 operates to receive and store the portion of the data intended for the module 210 and provide the portion of the data intended for the module 210 to the module 210 as the module 210 signals a readiness to accept the data. The output buffer 540 operates to receive and store output data from the module 210 and provide the data from the module 210 to the on-ramp multiplexer 520. The on-ramp multiplexer 520 operates to receive the output data from the module 210 and multiplex the data from the module 210 with other data received from the off-ramp demultiplexer 510 to form multiplexed data. The on-ramp multiplexer 520 further operates to provide the multiplexed data to circular bus 230 or 232.

The communications port 220 or 222 preferably also includes a port controller 550 coupled to control the operations of the off-ramp demultiplexer 510, the on-ramp multiplexer 520, the input buffer 530, and the output buffer 540. The means of port controller 550 may also be incorporated within the other individual components of the communications port 220 or 222 as desired. The preferred operation of the port controller 550 includes providing clocking signals to each of the off-ramp demultiplexer 510, the on-ramp multiplexer 520, the input buffer 530, and the output buffer 540. The port controller 550 also preferably includes bus interface logic 560.

As each module 210 preferably includes a unique address, the port controller 550 preferably further operates to receive addresses of received data from the off-ramp demultiplexer 510 and determine if the unique address of the module 210 is present. The port controller 550 then operates to direct the off-ramp demultiplexer 510 to provide data associated with the unique address of the module 210 to the input buffer 530 if the port controller 550 determines that the unique address of the module 210 is present. Alternatively, the address decoding logic is comprised in the off-ramp demultiplexer 510, or in specialized address decoding logic coupled to the off-ramp demultiplexer 510.

Bus interface logic 560 for accessing the on-chip circular bus 230 or 232 and performing data transfers on the on-chip circular bus 230 or 232 is preferably comprised in port controller 550 but may also be comprised in off-ramp demultiplexer 510, on-ramp multiplexer 520 or another component comprised in module 210 or communications port 220. Bus interface logic 560 may also be separate from other parts of module 210 or communications 220 or 222. Additional details relating to FIG. 5 are described in reference to other figures according to the uniform numbering scheme.

Conclusion

Therefore, the present invention comprises an improved system for connecting modules on a computer chip in an on-chip data transfer network. Although the system of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A computer chip comprising a data transfer network, the data transfer network comprising:
    a plurality of buses comprised on the computer chip, wherein each of said plurality of buses is configured in a circular topology;
    a plurality of communications ports comprised on the computer chip, wherein each of said plurality of communications ports is coupled to one or more of said plurality of buses, wherein one or more of said plurality of communications ports is operable to route data from a source bus to a destination bus; and
    a plurality of modules, wherein each of said plurality of modules is coupled to at least one of said plurality of communications ports, wherein said plurality of modules are operable to communicate with each other through one or more of said buses.

2. The computer chip of claim 1, wherein each of said plurality of buses is operable to transfer data in only one direction.

3. The computer chip of claim 2, wherein said plurality of buses include a first bus and a second bus, wherein the first bus is operable to transfer data in a first direction and wherein the second bus is operable to transfer data in a second opposite direction.

4. The computer chip of claim 3, wherein each of said plurality of buses is operable to transfer data in a direction opposite to a direction of a nearest neighboring bus of said plurality of buses.

5. The computer chip of claim 1, wherein each of said plurality of buses are operable to transfer data in two directions.

6. The computer chip of claim 1, wherein said plurality of communications ports are further operable to route data from a first bus to an associated module.

7. The computer chip of claim 1, wherein said each of said plurality of modules is coupled to two or more communications ports of said plurality of communications ports.

8. The computer chip of claim 7, wherein each of said two or more communications ports is coupled to different buses of said plurality of buses.

9. The computer chip of claim 1, wherein each of said modules comprises one or more communications ports, wherein each of said one or more communications ports are coupled to ones of said plurality of buses, wherein said each of said one or more communications ports is operable to transmit and receive data on said ones of said plurality of buses.

10. The computer chip of claim 1, further comprising:
    a bus controller comprised on said computer chip, wherein said bus controller is coupled to one or more of said plurality of buses, wherein said bus controller is operable to control data transfers by said plurality of modules on or through said one or more of said plurality of buses;
    wherein the bus controller includes arbiter logic for arbitrating access to the one or more of said plurality of buses.

11. The computer chip of claim 1, wherein each of said plurality of modules is selected from a group including a processor, a memory, an I/O controller, a task-specific hybrid, and a task-general hybrid.

12. The computer chip of claim 1,
    wherein one or more of said plurality of communications ports is further operable to transfer data from one of said plurality of buses to a bus connection operable to route said transferred data to a device off of said computer chip; and
    wherein one or more of said plurality of communications ports is further operable to receive data from said device off of said computer chip and transfer said received data to one of said plurality of buses.

13. The computer chip of claim 1, wherein one or more of said plurality of buses includes address and control lines.

14. A computer chip comprising a data transfer network, the data transfer network comprising:
    a plurality of communications ports comprised on the computer chip;
    a plurality of transfer paths comprised on the computer chip, wherein each of said plurality of transfer paths are directly connected between two of said communications ports, wherein a first group of said plurality of transfer paths and a first group of said plurality of communications ports collectively forms a first traffic circle, wherein a second group of said plurality of transfer paths and a second group of said plurality of communications ports collectively forms a second traffic circle different from said first traffic circle, wherein each of said plurality of communications ports is coupled to at least two transfer paths, wherein each of said plurality of communications ports is operable to route data from a source transfer path to a destination transfer path; and a plurality of modules, wherein each of said plurality of modules is coupled to at least one of said plurality of communications ports, wherein said plurality of modules are operable to communicate with each other through said transfer paths.

15. The computer chip of claim 14, wherein at least a subset of said plurality of modules are coupled to one or more communications ports in said first group of said plurality of communications ports in said first traffic circle, wherein said subset of said plurality of modules are further coupled to one or more communications ports in said second group of said plurality of communications ports in said second traffic circle, wherein said subset of said plurality of modules are operable to communicate through said first traffic circle and said second traffic circle.

16. The computer chip of claim 14, wherein data flow on said second traffic circle is in the opposite direction to data flow on said first traffic circle.

17. The computer chip of claim 14, wherein each of said modules comprises a communications port coupled to one of said transfer paths, wherein the communications port is operable to transmit and receive data on said one of said transfer paths.

18. The computer chip of claim 14, wherein each of said plurality of transfer paths are operable to transfer data in two directions.

19. The system of claim 14, wherein each of said plurality of modules is selected from a group including a processor, a memory, an I/O controller, a task-specific hybrid, and a task-general hybrid.

20. A computer chip comprising a data transfer network, the data transfer network comprising:

a first circular bus comprised on the computer chip;

a second circular bus comprised on the computer chip;

wherein each of said first and second circular buses is configured in a circular topology, wherein each of said first and second circular buses is operable to transfer data in a circular fashion;

a plurality of communications ports comprised on the computer chip; wherein each of said plurality of communications ports is coupled to one or more of said first circular data bus and said second circular data bus, wherein each of said plurality of communications ports is operable to route data from a source bus to a destination bus; and a plurality of modules, wherein each of said plurality of modules is coupled to at least one of said plurality of communications ports, wherein said plurality of modules are operable to communicate with each other through one or more of said buses.

* * * * *